United States Patent [19]

Coby et al.

[11] Patent Number: 4,935,878

[45] Date of Patent: Jun. 19, 1990

[54] SYSTEM FRICTION COMPENSATION IN VECTOR PLOTTERS

[75] Inventors: August D. Coby, Brea; Sandor L. Lengyel, Orange, both of Calif.

[73] Assignee: Calcomp Inc., Anaheim, Calif.

[21] Appl. No.: 293,830

[22] Filed: Jan. 4, 1989

[51] Int. Cl.⁵ .......................... G01D 18/00; G06F 3/13
[52] U.S. Cl. ................................. 364/520; 346/139 R; 364/571.05; 364/167.01
[58] Field of Search .................... 364/520, 519, 167.01, 364/571.05; 346/1.1, 134, 139 R, 136

[56] References Cited

U.S. PATENT DOCUMENTS

| | | | |
|---|---|---|---|
| 3,555,254 | 1/1971 | Gerber | 318/632 |
| 3,654,446 | 4/1972 | Gordon et al. | 364/571.05 |
| 4,591,969 | 5/1986 | Bloom et al. | 364/183 |
| 4,710,865 | 12/1987 | Higomura | 364/170 |
| 4,751,526 | 6/1988 | Tohara | 346/139 R |
| 4,794,408 | 12/1988 | Niemeyer, III | 346/139 R |

Primary Examiner—Gary V. Harkcom
Assistant Examiner—Raymond J. Bayerl
Attorney, Agent, or Firm—Donald A. Streck; Wm. F. Porter, Jr.

[57] ABSTRACT

A method and associated apparatus for frictionally compensating a vector plotter having an X-drive motor for driving plotting apparatus in +X and −X directions and a Y-drive motor for driving plotting apparatus in +Y and −Y directions and logic for applying positive and negative electrical drive currents to the respective motors to affect plotting. Plotter accuracy and associated plot quality are improved by the method which comprises the steps of, providing a memory for holding +X, −X, +Y, and −Y friction compensation factors; prior to the time of plotting with the vector plotter, calibrating the plotter by (1) causing the motors to move the plotting apparatus in +X, −X, +Y, and −Y directions, (2) measuring the friction during the +X, −X, +Y, and −Y directional movement, and (3) calculating and storing the +X, −X, +Y, and −Y friction compensation factors in the memory. At the time of plotting with the vector plotter, the method comprises adjusting the current applied to the drive motors by the plotter logic as a function of the proper friction compensation factor in the memory for the motor moved and the direction of motor movement.

9 Claims, 3 Drawing Sheets

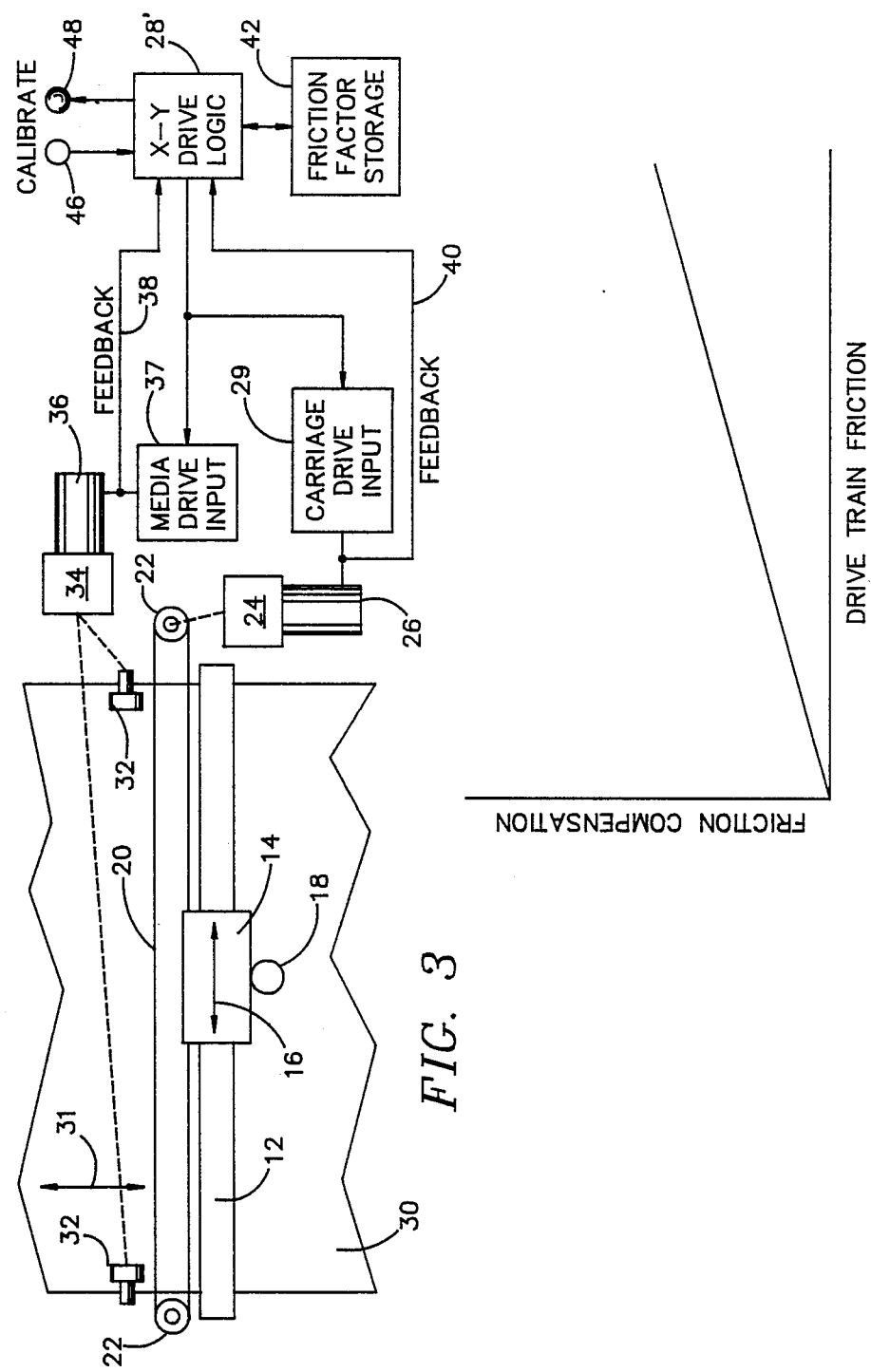

4,935,878

SYSTEM FRICTION COMPENSATION IN VECTOR PLOTTERS

BACKGROUND OF THE DISCLOSURE

The present invention relates to vector plotters and, more particularly, to an improvement for compensating for friction between the drive motors and the plotting apparatus to improve accuracy and plot quality of a vector plotter having an X-drive motor for driving plotting apparatus in +X and −X directions and a Y-drive motor for driving plotting apparatus in +Y and −Y directions and logic for applying positive and negative electrical drive currents to the respective motors to effect plotting, said improvement comprising, memory means for holding +X, −X, +Y, and −Y friction compensation factors; first supplemental logic means for, prior to the time of plotting with the vector plotter, calibrating the plotter by causing the motors to move the plotting apparatus in +X, −X, +Y, and −Y directions, measuring the friction during the +X, −X, +Y, and −Y directional movement, calculating and storing the +X, −X, +Y, and −Y friction compensation factors in the memory means; and, second supplemental logic means for, at the time of plotting with the vector plotter, adjusting the current applied to the drive motors by the plotter logic as a function of the proper friction compensation factor in the memory means for the motor moved and the direction of movement thereof.

Vector plotters are an important part of modern computer systems as employed in many environments. They provide the ability to have the computer produce large drawings for engineering uses and otherwise. While early plotters moved a pen over stationary paper in both the X and Y directions (and the present invention would have benefit in such a plotter), most contemporary plotters operate by moving the paper in the X direction and moving a pen across the paper in the Y direction. This arrangement permits the plotting of large drawings in a much smaller amount of floor space. As depicted in simplified form in FIG. 1, a typical plotter 10 has a horizontal beam 12 upon which a carriage 14 is mounted for transverse movement from side to side as indicated by the arrows 16. The carriage 14 carries the pen 18 employed to create the drawings. The carriage 14 is moved by a loop of non-stretching tape 20 passing over guide rollers 22. The tape 20 is driven by a drive system symbolized by the box 24. The drive system 24 can comprise various components (e.g. gears, belts, etc.) according to the particular implementation. The specifics of the particular components are not important and, therefore, in the interest of simplicity, are not shown. The drive system 24 is driven bi-directionally by a carriage motor 26 under the control of X—Y drive logic 28 through carriage drive input 29.

In a similar fashion, the media 30 is moved under the beam 12 (and perpendicular thereto) as indicated by the arrows 31. One popular approach, as depicted in FIG. 1, is to position a pair of drive rollers 32 opposite one another at the edges of (and gripping by pinching in combination with other rollers, not shown) the media 30. The drive rollers 32 are driven by a drive system symbolized by the box 34. Like the drive system 24, the drive system 34 can comprise various components (e.g. gears, belts, etc.) according to the particular implementation. The drive system 34 is driven bi-directionally by a media motor 36 also under the control of the X—Y drive logic 28 through media drive input 37.

In working with a new plotter of the type shown in FIG. 1 as developed by the assignee of this application, the inventors herein found that the accuracy and therefore the plot quality of the plotter was not as expected. In investigating the problem, they found nothing in the plotter's design and implementation that single-handedly accounted for the difference between expected performance and actual performance. It was eventually theorized (and ultimately proved to be true) that within the high speed environment of the plotter, the friction throughout the system (primarily in the drive systems 24 and 34), while individually relatively insignificant, was cummulatively significant with respect to the accuracy of movement accomplished by the servo motors employed therein sufficiently to degrade overall system performance. Moreover, the inherent system friction could change from plotter to plotter (probably as a result of parts tolerances), could change over time (evidently as a result of the frictional heating and expanding of parts), and could change as a result of different media and pen type combination employed in the plotting process. A graph of the performance of prior art vector plotters as a function of this drive train friction is shown in FIG. 2. As can be seen, as the friction increases, the performance (i.e., plot quality) drops off correspondingly.

Wherefore, it is the object of the present invention to provide a dynamic frictional compensation system for incorporation into vector plotters, and the like, which will permit them to achieve maximum possible positional accuracy and attendant plot quality.

It is another object of the present invention to provide a frictional compensation system for incorporation into vector plotters, and the like, which will dynamically measure, calculate, and compensate for system friction affecting positional accuracy and attendant plot quality.

Other objects and benefits of the present invention will become apparent from the description which follows hereinafter when taken in conjunction with the drawing figures which accompany it.

SUMMARY

The foregoing objects have been achieved in a vector plotter having an X-drive motor for driving plotting apparatus in +X and −X directions and a Y-drive motor for driving plotting apparatus in +Y and −Y directions and logic for applying positive and negative electrical drive currents to the respective motors to effect plotting, by the improvement for compensating for friction between the drive motors and the plotting apparatus to improve plotter accuracy and plot quality of the present invention comprising, memory means for holding +X, −X, +Y, and −Y friction compensation factors; first supplemental logic means for, prior to the time of plotting with the vector plotter, calibrating the plotter by causing the motors to move the plotting apparatus in +X, −X, +Y, and −Y directions, measuring the friction during the +X, −X, +Y, and −Y directional movement, calculating and storing the +X, −X, +Y, and −Y friction compensation factors in the memory means; and, second supplemental logic means for, at the time of plotting with the vector plotter, adjusting the current applied to the drive motors by the plotter logic as a function of the proper friction compensation factor in the memory means for the motor moved and the direction of movement thereof.

In the preferred embodiment, the vector plotter plotting apparatus includes means for driving a media in +X (forward) and −X (backward) directions and means for driving a carriage in +Y (right) and −Y (left) directions and the first supplemental logic includes logic for performing the steps of, determining if it is time to calibrate the plotter for friction compensation and, if it is, continuing to the next step, otherwise exiting; moving the carriage left at a creep speed; while the carriage is moving left at the creep speed, measuring the friction associated with the movement and saving a carriage left friction factor (FRy−) in the memory means; moving the carriage at the creep speed; while the carriage is moving right at the creep speed, measuring the friction associated with the movement and saving a carriage right friction factor (FRy+) in the memory means; moving the media forward at the creep speed; while the media is moving forward at the creep speed, measuring the friction associated with the movement and saving a media forward friction factor (FRx+) in the memory means; moving the media backward at the creep speed; and, while the media is moving backward at the creep speed, measuring the friction associated with the movement and saving a media backward friction factor (FRx−) in the memory means. Further in the preferred embodiment, the Y-drive motor is connected to move the carriage left and right and the X-drive motor is connected to move the media forward and backward and the second supplemental logic includes logic for performing the steps of, checking to see if the carriage is being moved and continuing to the next checking step if it is not, otherwise continuing with the next step; obtaining FRy+ or FRy−, as appropriate to the direction of movement thereof, from the memory means; adding a sufficient compensation to the power being applied to the Y-drive motor to offset FRy+ or FRy−, as appropriate; checking to see if the media is being moved and continuing to the next step if it is, otherwise exiting; obtaining FRx+ or FRx−, as appropriate to the direction of movement thereof, from the memory means; adding a sufficient compensation to the power being applied to the X-drive motor to offset FRx+ or FRx−, as appropriate.

DESCRIPTION OF THE DRAWINGS

FIG. 3 is a simplified drawing of a vector plotter according to the present invention wherein friction compensation is included.

FIG. 4 is a graph depicting how friction compensation is applied to the motor drives in a vector plotter according to the present invention.

DESCRIPTION OF THE PREFERRED EMBODIMENT

Figures 1, 2:
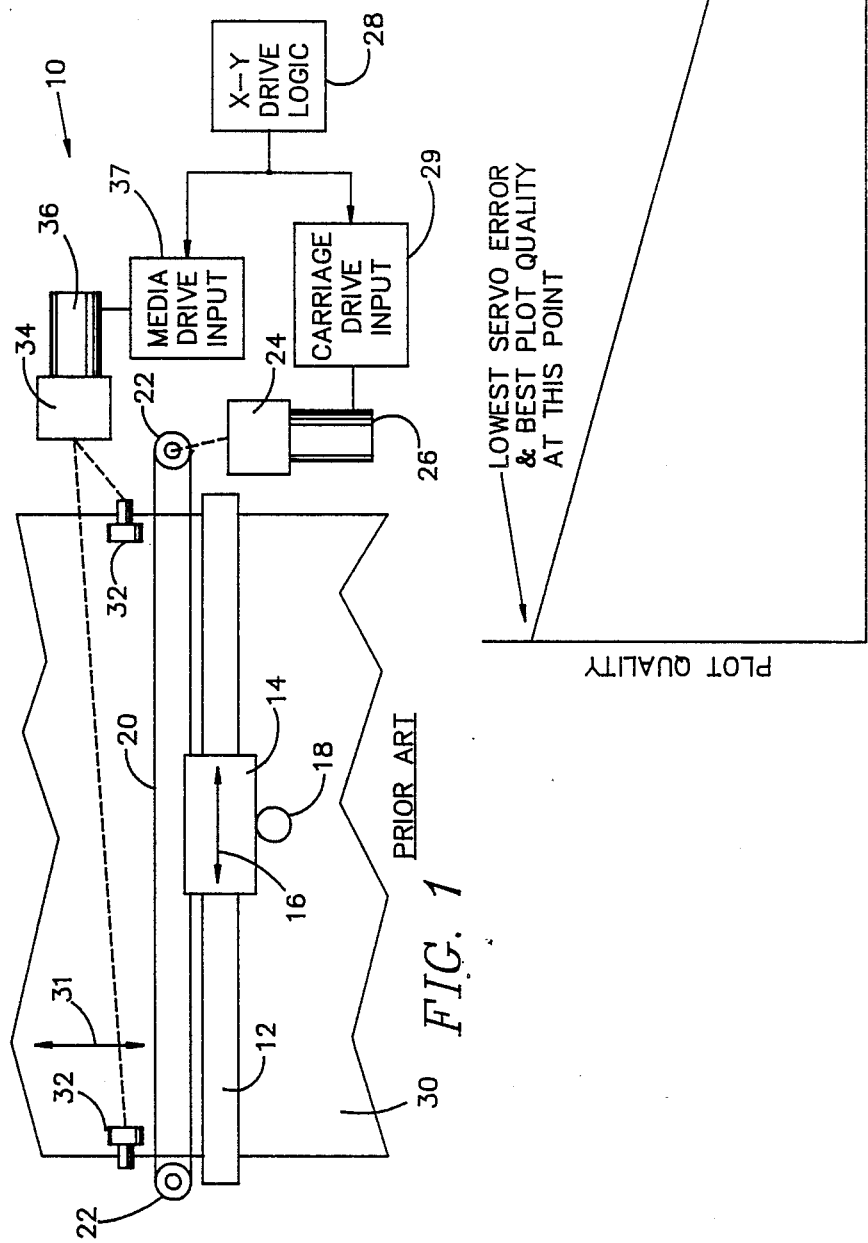
FIG. 1 is a simplified drawing of a vector plotter according to the prior art wherein no friction compensation is present.
FIG. 2 is a graph depicting how plotter performance (i.e. plot quality) drops off as a function of uncompensated system friction.

A plotter 10' according to the present invention is shown in simplified form in FIG. 3 as a modification of the plotter 10 of FIG. 1. For convenience and simplicity, like components are shown with like numbers. Basically, the present invention comprises including logic within the X—Y drive logic 28' for periodically and dynamically determining the basic system friction and for applying an appropriate compensation factor to the motors 26, 36 so as to drive the carriage 14 and media 30 at their maximum accuracy from point to point as they cause the vectors comprising the plot to be drawn. As depicted in FIG. 4, the compensation applied to the motors 26, 36 is essentially a function of the inverse of the dropoff in performance depicted in the graph of FIG. 2.

To accomplish the objectives of the present invention, there is feedback signals 38 and 40 are provided from the media motor 36 and carriage motor 26, respectively, to the X—Y drive logic 28'. Additionally, friction factor storage memory 42 is operably connected to be stored into and read from by the X—Y drive logic 28'.

Figure 5:
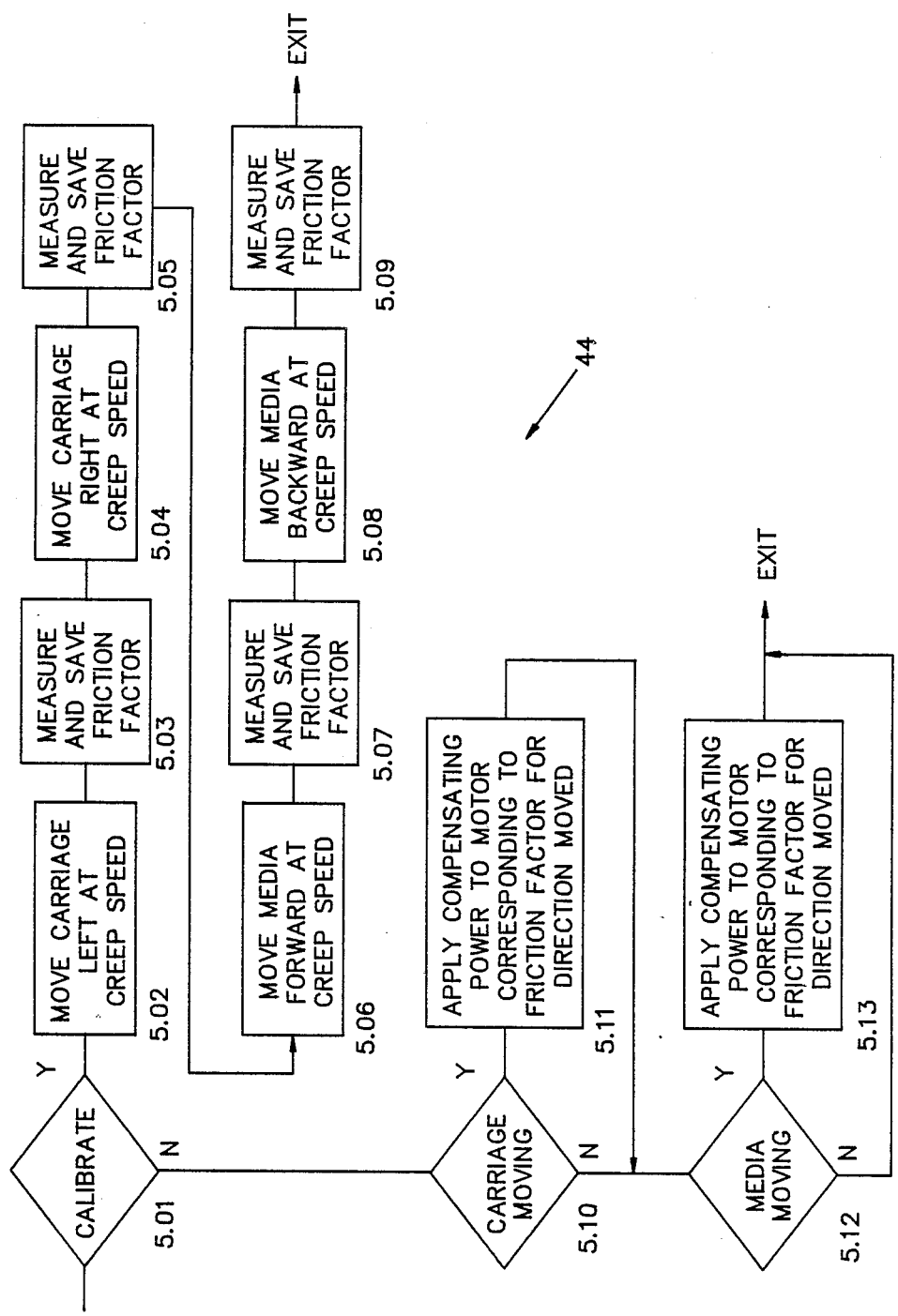
FIG. 5 is a logic flowchart of one possible implementation of compensation logic according to the present invention.

Operation of the present invention can best be understood with simultaneous reference to FIG. 3 and the logic flowchart of FIG. 5, which represents one way in which the logic of the present invention could be incorporated into the X—Y drive logic 28'. The compensation logic, generally indicated as 44, is periodically entered at decision block 5.01 as part of the overall logic of the plotter 10'. This aspect of plotters (i.e., the overall plotter logic) is well known by those skilled in the art and varies from plotter to plotter and, therefore, is not shown or described in any detail herein in the interest of simplicity and the avoidance of redundancy. In decision block 5.01, the logic determines if it is time to calibrate the plotter 10' for friction compensation. In the commercial embodiment of this invention as incorporated into plotters manufactured and sold by the assignee of this application, re-calibration is accomplished each time a new plotting media is loaded into the plotter. Re-calibration could be accomplished as a function of time, on demand, or many other ways, if desired for a particular application within the scope and spirit of the present invention.

When the logic 44 finds at decision block 5.01 that it is time to do a calibration, it moves to block 5.02 where the carriage is moved left at creep speed. As those skilled in the art will readily appreciate, the carriage could be moved right first or, the media drive could be calibrated before the carriage. Again by way of comment, in the commercial embodiment of the assignee of this application, the carriage and media are moved simultaneously as part of the calibration process as the two movements are frictionally independent and, additionally, accomplishing the two directional measurements and calculations in virtual parallel significantly reduces the calibration time. For simplicity of explanation only, the logic is shown and described as a series of sequential steps.

While the carriage is moved left at creep speed, at block 5.03 the logic 44 measures the friction and saves a carriage left (i.e. Y direction left) friction factor (FRy−) in the memory 42. The friction factor typically can best be obtained as a function of where the carriage (or media) moved as a result of a given current input to the drive motor 26, 36 in comparison to the position it was expected to achieve, i.e. any measurement that will accurately indicate how much energy was wasted as friction instead of movement. In a tested embodiment, the inventors herein obtained the friction factors by obtaining average values out of X and Y digital-toanalog converters (DACs) during the creep speed movements. The friction factors can be obtained from any convenient source depending on the construction of the particular plotting device. For purposes of the description herein, the sources are indicated simply by the feedback signal lines 38 and 40. Following the determination of the FRy− feedback factor, the logic 44 obtains Y right (FRy+) at blocks 5.04 and 5.05, X forward (FRx+) at blocks 5.06 and 5.07, and X backwards (FRx−) at blocks 5.08 and 5.09. The X friction factors, of course, are also obtained by moving the media at creep speed. When the calibration process is completed, the logic 44 exits.

When not calibrating at decision block 5.01, the compensation logic moves on to decision block 5.10 where it determines if the carriage is being moved. Again, if desired, movement of the media could be checked for first and in actual practice the compensation is applied simultaneously to both motors when they are moving simultaneously (which is very often the case). If the carriage is in the process of being moved (i.e. the vector being drawn has a Y directional component), the logic 44 moves on to block 5.11 where an appropriate compensation is added to the power being applied to the motor 26 to effect the movement thereof so as to offset FRy+ or FRy− (obtained from the memory 42), as appropriate. After applying carriage compensation, or following the "no" path of decision block 5.10, the logic 44 moves on to decision block 5.12 where it determines if the media is being moved. If the media is in the process of being moved (i.e. the vector being drawn has an X directional component), the logic 44 moves on to block 5.13 where an appropriate compensation is added to the power being applied to the motor 36 to effect the movement thereof so as to offset FRx+ or FRx− (obtained from the memory 42), as appropriate. After applying media compensation, or following the "no" path of decision block 5.12, the logic 44 exits.

Wherefore, having thus described the invention, what is claimed is:

1. In a vector plotter having an X-drive motor for driving plotting apparatus in +X and −X directions and a Y-drive motor for driving plotting apparatus in +Y and −Y directions and logic for applying positive and negative electrical drive currents to the respective motors to effect plotting, the improvement for during plotting constantly compensating for friction between the drive motors and the plotting apparatus to improve plotter accuracy and plot quality comprising:
   (a) memory means for holding +X, −X, +Y, and −Y friction compensation factors;
   (b) first supplemental logic means for, prior to the time of plotting with the vector plotter, calibrating the plotter by causing the motors to move the plotting apparatus in +X, −X, +Y, and −Y directions, measuring the friction during said +X, −X, +Y, and −Y directional movement, calculating and storing said +X, −X, +Y, and −Y friction compensation factors in said memory means; and,
   (c) second supplemental logic means for, during plotting with the vector plotter, constantly adjusting the current applied to the drive motors by the plotter logic as a function of the proper said friction compensation factor in said memory means for the motor moved and the direction of movement thereof.

2. The improvement to a vector plotter of claim 1 wherein the vector plotter plotting apparatus includes means for driving a media in +X (forward) and −X (backward) directions and means for driving a carriage in +Y (right) and −Y (left) directions and wherein said first supplemental logic includes logic for performing the steps of:
   (a) determining if it is time to calibrate the plotter for friction compensation and, if it is, continuing to the next step, otherwise exiting;
   (b) moving the carriage left at a creep speed;
   (c) while the carriage is moving left at said creep speed, measuring the friction associated with the movement and saving a carriage left friction factor (FRy−) in said memory means;
   (d) moving the carriage right at said creep speed;
   (e) while the carriage is moving right at said creep speed, measuring the friction associated with the movement and saving a carriage right friction factor (FRy+) in said memory means;
   (f) moving the media forward at said creep speed;
   (g) while the media is moving forward at said creep speed, measuring the friction associated with the movement and saving a media forward friction factor (FRx+) in said memory means;
   (h) moving the media backward at said creep speed; and,
   (i) while the media is moving backward at said creep speed, measuring the friction associated with the movement and saving a media backward friction factor (FRx−) in said memory means.

3. The improvement to a vector plotter of claim 2 wherein the Y-drive motor is connected to move the carriage left and right and the X-drive motor is connected to move the media forward and backward and said second supplemental logic includes logic for performing the steps of:
   (a) checking to see if the carriage is being moved and continuing to step (d) if it is not, otherwise continuing with the next step;
   (b) obtaining FRy+ or FRy−, as appropriate to the direction of movement thereof, from said memory means;
   (c) adding a sufficient compensation to the power being applied to the Y-drive motor to offset FRy+ or FRy−, as appropriate;
   (d) checking to see if the media is being moved and continuing to the next step if it is, otherwise exiting;
   (e) obtaining FRx+ or FRx−, as appropriate to the direction of movement thereof, from said memory means; and,
   (f) adding a sufficient compensation to the power being applied to the X-drive motor to offset FRx+ or FRx−, as appropriate.

4. The improvement to a vector plotter of claim 1 wherein said first supplemental logic means includes:
   means for automatically calibrating the plotter whenever a new media is loaded therein.

5. In a vector plotter having an X-drive motor for driving plotting apparatus in +X and −X directions and a Y-drive motor for driving plotting apparatus in +Y and −Y directions and logic for applying positive and negative electrical drive currents to the respective motors to effect plotting, the method of preparation and operation to compensate for friction between the drive motors and the plotting apparatus to improve plotter accuracy and plot quality comprising the steps of:
   (a) providing memory means for holding +X, −X, +Y, and −Y friction compensation factors;

(b) prior to the time of plotting with the vector plotter, calibrating the plotter by
 (b1) causing the motors to move the plotting apparatus in +X, −X, +Y, and −Y directions,
 (b2) measuring the friction during the +X, −X, +Y, and −Y directional movement, and
 (b3) calculating and storing the +X, −X, +Y, and −Y friction compensation factors in the memory means; and,
(c) at the time of plotting with the vector plotter, constantly adjusting the current applied to the drive motors by the plotter logic as a function of the proper friction compensation factor in the memory means for the motor moved and the direction of movement thereof.

6. The method of claim 5 wherein the vector plotter plotting apparatus includes means for driving a media in +X (forward) and −X (backward) directions and means for driving a carriage in +Y (right) and −Y (left) directions and wherein prior to the steps for calibrating the plotter there are the additional steps of:
(a) determining if it is time to calibrate the plotter for friction compensation and, if it is, continuing to the next step, otherwise exiting;
(b) moving the carriage left at a creep speed;
(c) while the carriage is moving left at the creep speed, measuring the friction associated with the movement and saving a carriage left friction factor (FRy−) in the memory means;
(d) moving the carriage right at the creep speed;
(e) while the carriage is moving right at the creep speed, measuring the friction associated with the movement and saving a carriage right friction factor (FRy+) in the memory means;
(f) moving the media forward at the creep speed;
(g) while the media is moving forward at the creep speed, measuring the friction associated with the movement and saving a media forward friction factor (FRx+) in the memory means;
(h) moving the media backward at the creep speed; and,
(i) while the media is moving backward at the creep speed, measuring the friction associated with the movement and saving a media backward friction factor (FRx−) in the memory means.

7. The method of claim 6 wherein the Y-drive motor is connected to move the carriage left and right and the X-drive motor is connected to move the media forward and backward and the step of adjusting the current applied to the drive motors by the plotter logic as a function of the proper friction compensation factor includes the steps of:
(a) checking to see if the carriage is being moved and continuing to step (d) if it is not, otherwise continuing with the next step;
(b) obtaining FRy+ or FRy−, as appropriate to the direction of movement thereof, from the memory means;
(c) adding a sufficient compensation to the power being applied to the Y-drive motor to offset FRy+ or FRy−, as appropriate;
(d) checking to see if the media is being moved and continuing to the next step if it is, otherwise exiting;
(e) obtaining FRx+ or FRx−, as appropriate to the direction of movement thereof, from the memory means; and,
(f) adding a sufficient compensation to the power being applied to the X-drive motor to offset FRx+ or FRx−, as appropriate.

8. The method of claim 5 and additionally including the steps of:
automatically calibrating the plotter whenever the plotting media being used therein is changed.

9. In a vector plotter having an X-drive motor for driving a plotting media forward and backward in +X and −X directions and a Y-drive motor for driving a plotting carriage right and left in +Y and −Y directions and logic for applying positive and negative electrical drive currents to the respective motors to effect plotting, the method of operation to compensate for friction between the drive motors and the plotting apparatus to improve plotter accuracy and plot quality comprising the steps of:
(a) providing memory means for holding +X, −X, +Y, and −Y friction compensation factors;
(b) prior to the time of plotting with the vector plotter, calibrating the plotter by the steps of,
 (b1) determining if it is time to calibrate the plotter for friction compensation and, if it is, continuing to the next step, otherwise exiting;
 (b2) moving the carriage left at a creep speed,
 (b3) while the carriage is moving left at the creep speed, measuring the friction associated with the movement and saving a carriage left friction factor (FRy−) in the memory means,
 (b4) moving the carriage right at the creep speed,
 (b5) while the carriage is moving right at the creep speed, measuring the friction associated with the movement and saving a carriage right friction factor (FRy+) in the memory means,
 (b6) moving the media forward at the creep speed,
 (b7) while the media is moving forward at the creep speed, measuring the friction associated with the movement and saving a media forward friction factor (FRx+) in the memory means,
 (b8) moving the media backward at the creep speed, and,
 (b9) while the media is moving backward at the creep speed, measuring the friction associated with the movement and saving a media backward friction factor (FRx−) in the memory means; and,
(c) at the time of plotting with the vector plotter, constantly adjusting the current applied to the drive motors by the steps of,
 (c1) checking to see if the carriage is being moved and continuing to step (c4) if it is not, otherwise continuing with the next step,
 (c2) obtaining FRy+ or FRy−, as appropriate to the direction of movement thereof, from the memory means,
 (c3) adding a sufficient compensation to the power being applied to the Y-drive motor to offset FRy+ or FRy−, as appropriate,
 (c4) checking to see if the media is being moved and continuing to the next step if it is, otherwise exiting,
 (c5) obtaining FRx+ or FRx−, as appropriate to the direction of movement thereof, from the memory means, and
 (c6) adding a sufficient compensation to the power being applied to the X-drive motor to offset FRx+ or FRx−, as appropriate.

* * * * *